US012459280B1

(12) United States Patent
Yue et al.

(10) Patent No.: US 12,459,280 B1
(45) Date of Patent: Nov. 4, 2025

(54) METHOD FOR IMPROVING GLOSSINESS AND INK COLOR FASTNESS OF PRINTED COLOR FILMS AND ITS APPLICATION THEREOF

(71) Applicant: CHINA TOBACCO YUNNAN INDUSTRIAL CO., LTD., Kunming (CN)

(72) Inventors: Baoshan Yue, Kunming (CN); Zhihua Liu, Kunming (CN); Zhenhua Yu, Kunming (CN); Jiao Xie, Kunming (CN); Geng Li, Kunming (CN); Ying Zhang, Kunming (CN); Hao Wang, Kunming (CN); Han Zheng, Kunming (CN); Yongfa Gui, Kunming (CN); Tingting Yu, Kunming (CN); Jing Zhang, Kunming (CN); Jiang Yu, Kunming (CN)

(73) Assignee: CHINA TOBACCO YUNNAN INDUSTRIAL CO., LTD., Kunming (CN)

( * ) Notice: Subject to any disclaimer, the term of this patent is extended or adjusted under 35 U.S.C. 154(b) by 0 days.

(21) Appl. No.: 19/239,965

(22) Filed: Jun. 17, 2025

Related U.S. Application Data

(63) Continuation-in-part of application No. PCT/CN2024/125291, filed on Oct. 16, 2024.

(30) Foreign Application Priority Data

Aug. 14, 2024 (CN) .......................... 202411110872.3

(51) Int. Cl.
*B41M 5/00* (2006.01)
*B41M 7/00* (2006.01)
*B65B 61/02* (2006.01)
*C08J 7/04* (2020.01)
*C08J 7/043* (2020.01)
*C08L 23/14* (2006.01)
*C09D 11/54* (2014.01)

(52) U.S. Cl.
CPC ........ *B41M 5/0017* (2013.01); *B41M 5/0064* (2013.01); *B41M 7/009* (2013.01); *B65B 61/025* (2013.01); *C08J 7/042* (2013.01); *C08J 7/043* (2020.01); *C08L 23/142* (2013.01); *C09D 11/54* (2013.01); *C08J 2323/14* (2013.01); *C08J 2483/04* (2013.01); *C08J 2495/00* (2013.01); *C08L 2203/16* (2013.01); *C08L 2205/03* (2013.01)

(58) Field of Classification Search
CPC .. B41M 5/0017; B41M 5/0064; B41M 7/009; B65B 61/025; C08J 7/042; C08J 7/043; C08J 2323/14; C08J 2483/04; C08J 2495/00; C08L 23/142; C08L 2203/16; C08L 2205/03; C09D 11/54
See application file for complete search history.

(56) References Cited

U.S. PATENT DOCUMENTS

| | | | |
|---|---|---|---|
| 6,756,124 B2 | 6/2004 | Kanamori et al. | |
| 9,144,931 B2 | 9/2015 | Huang et al. | |
| 11,213,996 B1* | 1/2022 | Adams .................... | B05D 3/007 |
| 2002/0007006 A1 | 1/2002 | Kanamori et al. | |
| 2003/0008153 A1* | 1/2003 | Migliorini ............. | B32B 27/306 |
| | | | 428/447 |
| 2003/0211298 A1* | 11/2003 | Migliorini ............... | B32B 27/08 |
| | | | 264/510 |
| 2005/0271888 A1* | 12/2005 | Moncla .................. | C09J 131/04 |
| | | | 428/523 |
| 2007/0292682 A1* | 12/2007 | Lee ........................ | C09J 123/14 |
| | | | 428/515 |
| 2013/0017403 A1 | 1/2013 | Huang et al. | |
| 2022/0213351 A1* | 7/2022 | Getschel .................... | C09J 7/38 |

FOREIGN PATENT DOCUMENTS

| | | | | |
|---|---|---|---|---|
| CN | 101049775 A | * | 10/2007 | |
| CN | 102085735 A | | 6/2011 | |
| CN | 109398942 A | * | 3/2019 | ............. B65D 75/66 |
| CN | 111548565 A | | 8/2020 | |
| CN | 115450066 A | * | 12/2022 | ............. D21H 21/06 |
| CN | 116461180 A | | 7/2023 | |

(Continued)

OTHER PUBLICATIONS

International Search Report, International Appl. No. PCT/CN2024/125291, Apr. 18, 2025, issued by the China National Intellectual Property Administration (ISA/CN), Beijing, China.
Written Opinion, International Appl. No. PCT/CN2024/125291, Apr. 18, 2025, issued by the China National Intellectual Property Administration (ISA/CN), Beijing, China.
Office Action, CN Pat. Appl. No. 202411110872.3, dated Apr. 23, 2025; issued by the China National Intellectual Property Administration (ISA/CN), Beijing, China.
Notice of Grant of Invention Patent Rights, CN Pat. Appl. No. 202411110872.3, dated Jun. 13, 2025; issued by the China National Intellectual Property Administration (ISA/CN), Beijing, China.

*Primary Examiner* — William P Fletcher, III
(74) *Attorney, Agent, or Firm* — CENTRAL CALIFORNIA IP GROUP, P.C.; Andrew D. Fortney

(57) ABSTRACT

A method for improving the glossiness and ink color fastness of a printed color film is disclosed. The printed color film is a composite biaxially oriented polypropylene (BOPP) film. The method includes: (1) pre-treating the outer and inner surfaces of the composite BOPP film; (2) coating the outer and inner surfaces of the composite BOPP film with a surface-modifying coating agent and drying at a high temperature; and (3) printing the outer surface of the composite BOPP film with a water-based colored ink, and drying to obtain the printed color film. An application of the printed color film obtained by the method for tobacco packaging film to improve the glossiness and the ink color fastness of the printed color film is also disclosed.

6 Claims, No Drawings

(56) References Cited

FOREIGN PATENT DOCUMENTS

| | | | |
|---|---|---|---|
| JP | 2013053329 | A | 3/2013 |
| KR | 20170044573 | A | 4/2017 |

\* cited by examiner

METHOD FOR IMPROVING GLOSSINESS AND INK COLOR FASTNESS OF PRINTED COLOR FILMS AND ITS APPLICATION THEREOF

CROSS-REFERENCE TO RELATED APPLICATIONS

This application is a continuation of International Pat. Appl. No. PCT/CN2024/125291, filed on Oct. 16, 2024, which claims the benefit of Chinese Pat. Appl. No. 202411110872.3, filed on Aug. 14, 2024, both of which are incorporated herein by reference as if fully set forth herein.

TECHNICAL FIELD

The present invention belongs to the technical field of tobacco, and specifically relates to a method and application for improving the glossiness and ink color fastness of printed color films.

BACKGROUND

Cigarette packaging film is generally a biaxially oriented polypropylene film (BOPP) film. During the production process of a BOPP film, it undergoes biaxial stretching, so the BOPP film has a high tensile strength and a high impact strength. It has excellent rigidity, toughness and transparency, with outstanding tensile strength, impact strength, high stiffness and high transparency. BOPP films are colorless, odorless, tasteless and non-toxic, and are a commonly used packaging material in the tobacco industry.

Due to the characteristics of BOPP films such as light weight, non-toxicity, high mechanical strength, good dimensional stability and good transparency, it is widely used in the packaging of candies, cigarettes, textiles, food, etc. However, some characteristics of BOPP films limit their application: (1) Biaxially oriented polypropylene film is a non-polar polymer. The exposed surface mainly consists of methyl groups, resulting in extremely low surface free energy. This leads to poor hydrophilicity, printability, adhesiveness and dyeability of its surface, which greatly limits its application range and makes its adhesiveness and printing and dyeing performance relatively poor. (2) The tertiary carbon atoms and methyl groups in the molecules of biaxially oriented polypropylene film carry active H elements. Under the influence of external oxygen and other conditions, they are prone to oxidation and degradation reactions, which is not conducive to their long-term storage and use.

High-end cigarette products are currently generally decorated and packaged with printed color films. Glossiness and haze are two important indicators of the optical performance of BOPP films. Films with low haze and high glossiness will make the appearance of cigarettes more upscale and bring a bright visual effect to cigarette packs. Compared with traditional non-printed cigarette films, printed color films require large-scale printing of multiple colors, and the printing process of printed color films is complex. The organic solvents used in printing can erode the macromolecular chains of the printed color film (cigarette film is generally BOPP). Therefore, water-based inks are generally used, and the drying process during printing is around 40° C., which leads to a certain degree of loss in the physical indicators of the printed color film, especially in performance indicators such as glossiness.

Water-based ink needs to dry quickly and have good resolubility at the same time. Generally, quick-drying inks have poor resolubility. Inks with good resolubility generally have poor water resistance and dry slowly, and the speed of the processing equipment cannot be increased. Water-based printing inks should have good adhesion with the composite adhesive, without bubbling or delamination. The printed ink layer may be in direct contact with a glue, and cannot be corroded by the glue on the printing surface. The speed of the equipment used for printing is high, generally above 180 meters per minute, and it has a high requirement for the quick drying of the ink.

In addition, the glossiness and haze of BOPP films tend to deteriorate over time. Therefore, it is necessary to develop new anti-adhesion masterbatches and apply them to BOPP films, while optimizing the formulation of the films and improving the optical properties and stability of the optical properties of BOPP films Therefore the present invention is disclosed.

SUMMARY

The present invention concerns a method for improving the glossiness of printed color films. The obtained printed color films, which have good light transmittance and glossiness performance and high ink color fastness, are used for tobacco packaging films.

The technical solution of the present invention is as follows:

The first aspect of the present invention discloses a method for improving the glossiness and the ink color fastness of printed color films. The printed color film comprises a composite BOPP film, and the method comprises the following steps:

(1) Pre-treating outer and inner surfaces of the composite BOPP film;

(2) Coating the outer and inner surfaces of the composite BOPP film with a surface-modifying coating agent and drying it at a high temperature; and (3) Printing the outer surface of the composite BOPP film with a water-based color ink, and drying to obtain the printed color film.

Preferably, the composite BOPP film comprises three layers: a surface layer comprising a blended film of a first PP copolymer, silica, a phenyl-modified silicone and hydrogenated petroleum resin; a core layer comprising a blended film of a PP homopolymer, an antistatic agent and the hydrogenated petroleum resin; and an inner layer comprising a blended film of a second PP copolymer, the phenyl-modified silicone and the hydrogenated petroleum resin. The second PP copolymer is generally, but not necessarily, different from the first PP copolymer. The phenyl-modified silicone in the inner layer is generally, but not necessarily, the same as the phenyl-modified silicone in the surface layer. The hydrogenated petroleum resin is generally the same in all three layers.

Preferably, the surface layer has a content of silica that is not higher than 0.08 wt %, a content of the phenyl-modified silicone that is 0.05-0.10 wt %, and a content of the hydrogenated petroleum resin is 3.0-5.0 wt %; the antistatic agent in the core layer comprises a mixture of an alkyl diethanolamine and a monoglyceride; the core layer has a content of the antistatic agent that is 0.35%-0.45 wt %, and a content of the hydrogenated petroleum resin that is 10.0-15.0 wt %; and the inner layer has a content of the phenyl-modified silicone that is 0.10-0.20 wt %, and a content of the hydrogenated petroleum resin that is 1.0-2.0 wt %. The balance or remainder of the surface layer is the first PP copolymer; the balance or remainder of the core layer is the PP homopolymer; and the balance or remainder of the inner layer is the second PP copolymer.

Preferably, in step (1), the outer surface of the composite BOPP film is pre-treated by low-temperature plasma surface activation using $CO_2$ gas. The inner surface of the composite BOPP film is treated by corona treatment at a voltage of 10-20 kV and a frequency of 2-5 kHz.

Preferably, the surface-modifying coating agent in step (2) has a composition that includes a waterborne silane coupling agent, an ethyl orthosilicate, a solid acid and water in a mass ratio of (5-10):(50-100):(5-10):(300-400).

Preferably, the waterborne silane coupling agent is one of methyl trichlorosilane (MTS) or an amino silane. The solid acid is ethylenediaminetetraacetic acid.

Preferably, the method further comprises preparing the surface-modifying coating agent by a process comprising the following steps: dissolving the waterborne silane coupling agent and the solid acid in water, and then adding the ethyl orthosilicate dropwise under high-speed stirring. After the reaction is completed, the surface-modifying coating agent is obtained.

Preferably, the outer and inner surfaces of the composite BOPP film are coated with the surface-modifying coating agent in step (2) by spraying, and the high temperature at which it is dried is 80-100° C.

Preferably, the drying temperature after printing in step (3) is 40-50° C.

A second aspect of the present invention concerns the application of the high-quality printed color film obtained by the method for improving the glossiness and the ink color fastness of the printed color film as a tobacco packaging film (i.e., a tobacco packaging film comprising the printed color film obtained by the method for improving the glossiness and the ink color fastness of the printed color film).

The beneficial effects of the present invention:
1. The method of the present invention improves the glossiness of the printed color film, while the haze and transparency are not affected or are slightly improved, and the ink color fastness is high. It is used for tobacco packaging film, and has good equipment adaptability. Note: Haze refers to the ratio of the scattered light flux passing through the sample and deviating from the direction of the incident light to the transmitted light flux, expressed as a percentage. Wearable capability refers to the ability of a film's surface to withstand damage from external friction. It is generally expressed by the change in haze value; that is, the difference obtained by subtracting the original haze value before friction from the haze value of the film after it is rubbed under a certain pressure, speed and number of times. The smaller the difference, the better the glossiness and the higher the ink color fastness. Conversely, the larger the difference, the worse the glossiness and the higher the ink color fastness are.
2. The method of improving the glossiness of the printed color film of the present invention adopts a three-layer composite BOPP film. Hydrogenated petroleum resin is contained in the surface layer, core layer and inner layer. The refractive index of hydrogenated petroleum resin is approximately 1.51, which is very close to that of BOPP (about 1.49). Both are non-polar materials with similar structures and good compatibility. Hydrogenated petroleum resin is an amorphous oligomer, and PP is a semi-crystalline polymer. The addition of hydrogenated petroleum resin expands the amorphous region of the mixed material, significantly changes the aggregated state structure of the PP polymer chain, partially dissolves the crystal structure of PP, and reduces the melting point of PP (from 161-162° C. to 140-150° C., for example). The crystalline particles of PP may be refined, thus improving the transparency of PP while keeping the haze unchanged or decreasing it. In addition, the surface and inner layers also contain a phenyl-modified silicone. The kinematic viscosity of the phenyl-modified silicone may be 100-280 $mm^2/s$, and the phenyl-modified silicone may have a refractive index close to that of PP, improving the glossiness of the BOPP film surface and enhancing its transparency.
3. In order to improve the bonding performance between the surface-modifying coating agent and the surface of the composite BOPP film, the method of the present invention conducts a low-temperature plasma surface activation treatment on the outer surface of the composite BOPP film using $CO_2$ gas. The inner surface of the composite BOPP film is subjected to corona treatment. The voltage for the corona treatment may be 2-100 kV, and the frequency may be 2-10 kHz. Since the surface layer of the composite BOPP film of the present invention is a blended film of a first PP copolymer (e.g., a copolymer primarily of propylene with 1-10 wt % of one or more $C_4$-$C_{12}$ monoalkenes, having a weight average or number average molecular weight of 50,000-200,000 g/mol), silica, a phenyl-modified silicone (e.g., a polysiloxane of the formula —(—O—$SiO_z[O_xPh]_y$-)$_n$-, where x is 0 or 1 for each instance of y, y is an average number in the range of 0.2-2, y+z=2, and n is a number or an average number of 3-10,000, having a viscosity of 20-500 cs) and hydrogenated petroleum resin, after the surface activation treatment with a low-temperature $CO_2$ plasma, the bonding ability of the surface-modifying coating agent is greater. After the water-based color ink printing, the glossiness of the color film is higher, and the wear resistance is improved at the same time. The inner layer is a blended film of a second PP copolymer (e.g., a copolymer primarily of propylene with 1-10 wt % of one or more $C_4$-$C_{12}$ monoalkenes, having a weight average or number average molecular weight of 100,000-300,000 g/mol that is generally greater than the molecular weight of the first PP copolymer, but which can be the same as the first PP copolymer), the hydrogenated petroleum resin and the phenyl-modified silicone. After corona treatment at a voltage of 10 to 20 kV and a frequency of 2 to 5 kHz, the surface-modifying coating agent bonds well with the inner layer. The peel strength of the coating film formed in a later stage is high, and there is no "grinding" phenomenon. At the same time, because many active points form on the surface after corona treatment, these active points may closely combine with or bond to the surface-modifying coating agent, and the entire BOPP surface is almost gap-free. Thus, the gas barrier property of the composite BOPP film and/or the printed color film is improved. Through the analysis of the low-temperature $CO_2$ plasma surface activation treatment of the composite BOPP film, polar groups such as —COOH and —OH are successfully introduced on the outer surface of the composite BOPP film, significantly increasing the surface free energy and enhancing the interfacial bonding ability between the outer surface of the composite BOPP film and the surface-modifying coating agent.
4. The surface-modifying coating agent of the present invention first dissolves the waterborne silane coupling agent (e.g., an aminoalkyl siloxane such as an aminosubstituted $C_2$-$C_6$ alkyl tri-$C_1$-$C_4$-alkoxysilane or an N-(ω-amino-$C_2$-$C_4$-alkylene) tri-$C_1$-$C_4$-alkoxysilane) and a solid acid in water, and then gradually adds the ethyl orthosilicate (e.g., tetraethyl orthosilicate) dropwise under high-speed stirring (the rotational speed is generally 1000-5000 RPM), to obtain for the first time a surface-modifying coating agent with good transparency and gloss. Analysis shows that the particles in the surface modification coating agent are approximately 30 nm in diameter and of uniform particle size.

5. The outer surface of the composite BOPP film of the present invention is treated with low-temperature $CO_2$ plasma surface activation, then coated with a surface-modifying coating agent, and finally printed with water-based colored ink on the outer surface of the composite BOPP film. The wear quality is relatively small and the gloss is improved. This is because polar groups such as —COOH and —OH generated on the outer surface after low-temperature $CO_2$ plasma surface activation treatment have good hydrophilicity, which enables good bonding performance with the surface-modifying coating agent, and the coating is uniform. The printed color film obtained by printing the outer surface of the composite BOPP film with water-based colored ink is firmly combined with the surface-modifying coating agent coating, and the ink color fastness is high.

6. The composite BOPP film prepared by the method of the present invention still has good gloss performance and ink color fastness after one year of natural aging.

EXAMPLES

The following is illustrated in combination with the embodiments. It should be understood that the preferred embodiments described herein are only for illustrating and explaining the present invention and are not intended to limit the present invention. Other advantages, objectives and features of the present invention will be elaborated in subsequent embodiments and to some extent are apparent to those skilled in the art, or can be learned by those skilled in the art from the practice of the present invention.

In order to improve the glossiness performance of BOPP printed color films without losing their wearable capability, the present application discloses a method for enhancing the glossiness of printed color films and obtaining printed color films for tobacco packaging films with improved glossiness performance without losing their light transmittance and wearable capability.

The method of improving the glossiness of the printed color film of the present invention, where the printed color film comprises a composite BOPP film, comprises the following steps: (1) Pretreating the outer and inner surfaces of the composite BOPP film. The composite BOPP film includes three layers: a surface layer, a core layer and an inner layer. The surface layer comprises a blended film of a first PP copolymer, silica, a phenyl-modified silicone and hydrogenated petroleum resin. In the surface layer, the content of silica is no higher than 0.08 wt %, the content of the phenyl-modified silicone is 0.05-0.10 wt %, and the content of the hydrogenated petroleum resin is 3-5 wt %. The core layer comprises a blended film of a PP homopolymer, an antistatic agent and the hydrogenated petroleum resin. In the core layer, the antistatic agent is a mixture of an alkyl diethanolamine (e.g., a straight-chain, branched and/or cyclic $C_6$-$C_{24}$ alkyl diethanolamine) and a monoglyceride (e.g., a monoester of glycerol with a $C_8$-$C_{24}$ saturated or unsaturated fatty acid), with the content of the antistatic agent being 0.35%-0.45 wt %, and the content of the hydrogenated petroleum resin being 10-15 wt %. The inner layer comprises a blended film of a second PP copolymer, the phenyl-modified silicone and the hydrogenated petroleum resin. In the inner layer, the content of the phenyl-modified silicone is 0.10-0.20 wt %, and the content of the hydrogenated petroleum resin is 1-2 wt %. The outer surface of the composite BOPP film can be pretreated by low-temperature plasma surface activation using $CO_2$ gas. The inner surface of the composite BOPP film can be treated by a corona treatment (e.g., a corona discharge) at a voltage of 10-20 kV and a frequency of 2-5 kHz. (2) The outer and inner surfaces of the composite BOPP film may be coated with the surface-modifying coating agent. The coating may comprise spraying the surface-modifying coating agent onto the outer and inner surfaces of the composite BOPP film and drying the composite BOPP film (or at least the outer and inner surfaces thereof) at a temperature of 80-100° C. The composition of the surface-modifying coating agent includes: a waterborne silane coupling agent (as described herein), ethyl orthosilicate (e.g., tetraethyl orthosilicate), a solid acid and water, in a mass ratio of 5-10 parts by mass of the waterborne silane coupling agent: 50-100 parts by mass of the ethyl orthosilicate: 5-10 parts by mass of the solid acid: 300-400 parts by mass of water. The silane coupling agent is either methyltrichlorosilane (MTS) or an amino silane (as described herein). The solid acid is ethylenediaminetetraacetic acid. The surface-modifying coating agent may be prepared by a process including the following steps: dissolving the waterborne silane coupling agent and the solid acid in water, then adding ethyl orthosilicate dropwise under high-speed stirring. After the reaction is completed, the surface-modifying coating is obtained. (3) The outer surface of the composite BOPP film is printed with a water-based color ink, and subsequent drying (e.g., of the ink) results in the printed color film.

Example 1: Methods for Enhancing the Glossiness of Printed Color Films (Shrink Films)

The composite BOPP film has three layers: the surface layer is a blended film with the contents of a PP copolymer (e.g., a copolymer of 2-3 wt % 1-hexene and the balance propylene, having an average molecular weight of 80,000-150,000), 0.05 wt % silica, 0.05 wt % of a phenyl-modified silicone (e.g., poly [diphenylsiloxane], having a viscosity of 100-150 cs, a phenyl content of 30-35%, and a flash point ≥300° C.) and 4.0 wt % of hydrogenated petroleum resin (having a softening point of 80-140° C. and a relative density of 0.970-0.975). The core layer is a blended film of a PP homopolymer (having a number average molecular weight of 50,000 to 80,000), 0.40 wt % of the antistatic agent (octadecyl diethanolamine and monostearin in a mass ratio of 1:0.3) and 10.0 wt % of the hydrogenated petroleum resin. The inner layer is a blended film of a PP copolymer (e.g., a copolymer of 2-3 wt % 1-hexene and the balance propylene, having an average molecular weight of 150,000-200,000), 0.15 wt % of the phenyl-modified silicone and 1.5 wt % of the hydrogenated petroleum resin.

The composition and preparation method of the surface-modifying coating agent: the waterborne silane coupling agent ((3-aminopropyl) triethoxysilane [APTES] or N-(2-aminoethyl)-3-aminopropyl trimethoxysilane), tetraethyl orthosilicate, a solid acid (ethylenediaminetetraacetic acid) and water in a mass ratio of 5:100:10:300. The amino silane (5 g) and ethylenediaminetetraacetic acid (10 g) are added to 300 g (ml) of water and mixed until dissolved. Then, tetraethyl orthosilicate (100 g) is added dropwise with stirring at 3000 RPM. After the dropping is completed, stir for another 10 minutes to obtain a transparent and slightly viscous surface-modifying coating agent.

The outer surface of the composite BOPP film was pretreated by low-temperature $CO_2$ plasma surface activation. Then, the surface-modifying coating agent is sprayed on the outer surface of the composite BOPP film (i.e., the exposed surface of the surface layer) to coat the composite BOPP film. After drying at 90° C., the outer surface of the composite BOPP film is printed with a water-based, commercially-available color ink, and after drying at 50° C., the printed color film is obtained.

Meanwhile, the inner surface of the composite BOPP film (i.e., the exposed surface of the inner layer) was treated with a corona treatment at 50 kV and 10 kHz, and then the inner surface of the composite BOPP film was sprayed with surface-modifying coating agent and dried at 90° C.

The obtained printed color film was tested for glossiness and light transmittance, and then naturally aged for one year before being tested again. The results are shown in Table 1 below.

Haze is determined in accordance with the provisions of GB/T2410 ("Test Methods for Light Transmittance and Haze of Transparent Plastics").

The glossiness is tested in accordance with the provisions of GB/T8807 ("Test Method for Mirror Glossiness of Plastics"), with light at an incident angle of 45°. During the test, it should be ensured that the plane formed by the incident and reflected light at the test window of the gloss tester is parallel to the longitudinal direction of the smoke film. The pad should be black and the gloss should not exceed 0.2%.

TABLE 1

Test results of the printed color film obtained in Example 1

| Test name | Unit | Industry average level | Standard requirement | Example 1 | After one-year natural ageing |
|---|---|---|---|---|---|
| Haze | % | 1.63 | ≤1.5 | 1.35 | 1.34 |
| Glossiness | % | 86.9 | ≥88 | 91.2 | 91.2 |

It can be seen from Table 1 that the glossiness of the composite BOPP film of the present invention is much higher than the industry average level, and the haze is much lower than the industry average level. After one year of natural aging, there is almost no change in glossiness and haze. This fully demonstrates that the composite BOPP film obtained by the preparation method of the present invention has significantly improved glossiness and ink color fastness, and has good aging resistance.

Machine adaptability: The cigarette film samples for machine adaptability testing are stored in an environment with a temperature of 22.0-27.0° C. and a relative humidity of 60%±5% for 24 hours before the machine test. During this process, the normal operation of the packaging machine is not affected by any quality defects of the cigarette film, the effective operation rate of the equipment is improved, and there are no defects such as loose packages or wrinkles that affect the quality of the cigarette packs, boxes and packaging.

Example 2: Methods for Enhancing the Glossiness of Printed Color Films (Shrink Films)

The composite BOPP film has three layers including the same materials as Example 1: The surface layer is a blended film with contents of the PP copolymer having an average molecular weight of 80,000-150,000, 0.05 wt % silica, 0.05 wt % of the phenyl-modified silicone and 4.0 wt % of the hydrogenated petroleum resin. The core layer is a blended film of the PP homopolymer, 0.40 wt % of the antistatic agent (the mass ratio of the alkyl diethanolamine and the monoglyceride is 1:0.3) and 10.0 wt % of the hydrogenated petroleum resin. The inner layer is a blended film of the PP copolymer having an average molecular weight of 150,000-200,000, 0.15 wt % of the phenyl-modified silicone and 1.5 wt % of the hydrogenated petroleum resin.

The composition and preparation method of the surface-modifying coating agent: the waterborne amino silane coupling agent, tetraethyl orthosilicate, the solid acid (ethylenediaminetetraacetic acid) and water in a mass ratio of 5:50:5:300. The amino silane (5 g) and ethylenediaminetetraacetic acid (5 g) were added to 300 g (ml) of water and mixed until dissolved. Then, 50 g of tetraethyl orthosilicate was added dropwise with stirring at 3000 RPM. After the dropping is completed, stir for another 10 minutes to obtain a transparent and slightly viscous surface-modifying coating agent.

The outer surface of the composite BOPP film was pretreated by low-temperature $CO_2$ plasma surface activation. Then, the surface-modifying coating agent is sprayed on the outer surface of the composite BOPP film to coat the composite BOPP film. After drying at 90° C., the outer surface of the composite BOPP film is printed with a commercially available water-based color ink, and after drying at 50° C., the printed color film is obtained.

Meanwhile, the inner surface of the composite BOPP film was treated a corona treatment at 50 kV and 10 kHz, and then the inner surface of the composite BOPP film was sprayed with surface modification coating agent and dried at 90° C.

Similar to Example 1, the obtained printed color film was tested for glossiness and light transmittance, and the results are shown in Table 2 below:

TABLE 2

Test results of the printed color film obtained in Example 2

| Test name | Unit | Industry average level | Standard requirement | Example 2 | After one-year natural ageing |
|---|---|---|---|---|---|
| Haze | % | 1.63 | ≤1.5 | 1.29 | 1.28 |
| Glossiness | % | 86.9 | ≥88 | 91.5 | 91.3 |

Machine adaptability: same as in Example 1.

Example 3: Methods for Enhancing the Glossiness of Printed Color Films (Micro-Shrink Films)

The composite BOPP film has three layers including the same materials as Examples 1 and 2: The surface layer is a blended film with contents of the PP copolymer having an average molecular weight of 80,000-150,000, 0.05 wt % silica, 0.05 wt % of the phenyl-modified silicone and 4.0 wt % of the hydrogenated petroleum resin. The core layer is a blended film of the PP homopolymer, 0.40 wt % of the antistatic agent (the mass ratio of the alkyl diethanolamine and the monoglyceride is 1:0.3) and 10.0 wt % of the hydrogenated petroleum resin. The inner layer is a blended film of the PP copolymer having an average molecular weight of 150,000-200,000, 0.15 wt % of the phenyl-modified silicone and 1.5 wt % of the hydrogenated petroleum resin.

The composition and preparation method of the modified coating agent: the waterborne amino silane coupling agent, tetraethyl orthosilicate, the solid acid (ethylenediaminetetraacetic acid) and water in a mass ratio of 10:50:10:400. The amino silane (10 g) and ethylenediaminetetraacetic acid (10 g) were added to 400 g (ml) of water and mixed until dissolved. Then, 50 g of tetraethyl orthosilicate was added dropwise with stirring at 3000 RPM. After the dropping is completed, stir for another 10 minutes to obtain a transparent and slightly viscous surface-modifying coating agent.

The outer surface of the composite BOPP film was pretreated by low-temperature $CO_2$ plasma surface activation. Then, the surface-modifying coating agent is sprayed on the outer surface of the composite BOPP film to coat the composite BOPP film. After drying at 90° C., the outer surface of the composite BOPP film is printed with a commercially available water-based color ink, and after drying at 50° C., the printed color film is obtained.

Meanwhile, the inner surface of the composite BOPP film was treated a corona treatment at 50 kV and 10 kHz, and then the inner surface of the composite BOPP film was sprayed with the surface-modifying coating agent and dried at 90° C.

Similar to Example 1, the obtained printed color film was tested for glossiness and light transmittance, and the results are shown in Table 3 below:

TABLE 3

Test results of the printed color film obtained in Example 3

| Test name | Unit | Industry average level | Standard requirement | Example 2 | After one-year natural ageing |
|---|---|---|---|---|---|
| Haze | % | 1.60 | ≤1.5 | 1.30 | 1.29 |
| Glossiness | % | 87.1 | ≥88 | 91.5 | 91.4 |

Machine adaptability: same as in Example 1.

Finally, it should be noted that the above preferred embodiments are used only to illustrate the technical solution of the present invention and not to limit it. Although the present invention has been described in detail through the above preferred embodiments, those skilled in the art should understand that various changes can be made to it in form and detail without deviating from the scope defined by the claims of the present invention.

What is claimed is:

1. A method for improving glossiness and ink color fastness of a printed color film, wherein the printed color film is a composite biaxially oriented polypropylene (BOPP) film, and the method comprises the following steps:
   pre-treating outer and inner surfaces of the composite BOPP film, wherein the composite BOPP film comprises (i) a surface layer comprising a blended film of a first polypropylene (PP) copolymer, silica, a phenyl-modified silicone and hydrogenated petroleum resin, (ii) a core layer comprising a blended film of a PP homopolymer, an antistatic agent and the hydrogenated petroleum resin, and (iii) an inner layer comprising a blended film of a second PP copolymer, the phenyl-modified silicone and the hydrogenated petroleum resin;
   coating the outer and inner surfaces of the composite BOPP film with a surface-modifying coating agent and drying it at a temperature of 80-100° C., wherein the surface-modifying coating agent includes a waterborne silane coupling agent, an ethyl orthosilicate, a solid acid and water in a mass ratio of (5-10):(50-100):(5-10):(300-400), the waterborne silane coupling agent is one of methyl trichlorosilane (MTS) or an amino silane, and the solid acid is ethylenediaminetetraacetic acid; and
   printing the outer surface of the composite BOPP film with a water-based colored ink, and drying to obtain the printed color film.

2. The method according to claim 1, wherein the surface layer has a content of silica that is not higher than 0.08 wt %, a content of the phenyl-modified silicone that is 0.05-0.10 wt %, and a content of the hydrogenated petroleum resin that is 3.0-5.0 wt %; the antistatic agent in the core layer comprises a mixture of an alkyl diethanolamine and a monoglyceride; the core layer has a content of the antistatic agent that is 0.35%-0.45 wt % and a content of the hydrogenated petroleum resin that is 10.0-15.0 wt %; and the inner layer has a content of the phenyl-modified silicone that is 0.10-0.20 wt % and a content of the hydrogenated petroleum resin that is 1.0-2.0 wt %.

3. The method according to claim 1, further comprising preparing the surface-modifying coating agent by dissolving the waterborne silane coupling agent and the solid acid in water, and then adding the ethyl orthosilicate dropwise under stirring.

4. The method according to claim 1, wherein the outer and inner surfaces of the composite BOPP film are coated with the surface-modifying coating agent by spraying.

5. The method according to claim 1, wherein drying to obtain the printed color film is conducted at a temperature of 40-50° C.

6. A tobacco packaging film comprising the printed color film obtained by the method according to claim 1.

* * * * *